United States Patent [19]
Gyulavári

[11] Patent Number: 4,559,141
[45] Date of Patent: Dec. 17, 1985

[54] APPARATUS FOR THE SEPARATION OF SOLID AND/OR LIQUID PARTICLES FROM A LIQUID

[75] Inventor: Imre Gyulavári, Debrecen, Hungary

[73] Assignee: Novex Találmányfejlesztö és Novexesitolmalyereskedelmi Rt., Budapest, Hungary

[21] Appl. No.: 240,159

[22] Filed: Mar. 3, 1981

Related U.S. Application Data

[63] Continuation of Ser. No. 124,444, Feb. 25, 1980, abandoned.

[30] Foreign Application Priority Data

Mar. 26, 1979 [HU] Hungary .............................. GU-329
Jun. 15, 1979 [HU] Hungary .............................. NO-234

[51] Int. Cl.$^4$ ............................................. B01D 21/02
[52] U.S. Cl. .................................................. 210/521
[58] Field of Search ............... 210/150, 151, 521, 522, 210/525

[56] References Cited

U.S. PATENT DOCUMENTS

| 863,168 | 8/1907 | Griswold, Jr. ................... | 210/521 X |
| 3,067,878 | 12/1962 | Genter et al. .................... | 210/521 X |
| 3,346,122 | 10/1967 | Cornelissen ......................... | 210/522 |
| 3,399,135 | 8/1968 | Conley, Jr. et al. ............. | 210/521 X |
| 3,454,165 | 7/1969 | Cornelissen ......................... | 210/522 |
| 3,482,694 | 12/1969 | Rice et al. ......................... | 210/522 X |
| 3,491,892 | 1/1970 | McCann ............................... | 210/521 |
| 3,529,728 | 9/1970 | Middelbeek et al. ............... | 210/522 |
| 3,615,025 | 10/1971 | Rice et al. ........................ | 210/521 |
| 3,666,111 | 5/1972 | Pielkenrood et al. ............... | 210/521 |
| 3,666,112 | 5/1972 | Pielkenrood et al. ............... | 210/521 |
| 3,710,949 | 1/1973 | Murkes ............................... | 210/522 |
| 3,741,401 | 6/1973 | Hsiung .............................. | 210/521 X |
| 3,837,501 | 9/1974 | Pielkenrood ........................ | 210/522 |
| 3,898,164 | 8/1975 | Hsiung .............................. | 210/521 |
| 3,899,427 | 8/1975 | Connelly et al. ................... | 210/521 |
| 4,132,651 | 1/1979 | de Jong ............................. | 210/522 |
| 4,136,012 | 1/1979 | Louboutin et al. .............. | 210/521 X |
| 4,138,342 | 2/1979 | Middelbeek et al. ............... | 210/522 |
| 4,184,954 | 1/1980 | Peterson ........................... | 210/521 X |

FOREIGN PATENT DOCUMENTS

| 1131602 | 6/1962 | Fed. Rep. of Germany | ...... 210/522 |
| 530940 | 1/1973 | Switzerland | ......................... 210/521 |

OTHER PUBLICATIONS

Neptune Microfloc, Inc., brochure entitled "Tube Settling", 1975.
Permutit, Technical Bulletin, vol. 9, No. 3, Jan. 1976.

Primary Examiner—Robert Spitzer
Attorney, Agent, or Firm—Manderville & Schreiber

[57] ABSTRACT

Liquid treatment apparatus, principally for effluent purification comprises a liquid basin with a suitable inlet and outlet, and a treatment space in which is disposed a lamellar insert construction forming a plurality of narrow, mutually parallel channels through which liquid flow is laminar and the axes of which are inclined to the vertical. For effluent purification the treatment space is a main sedimentation space downstream of a preliminary sedimentation space. The lamellar insert construction can be suspended from floats connected to a mobile dredger for movement with the latter.

6 Claims, 15 Drawing Figures

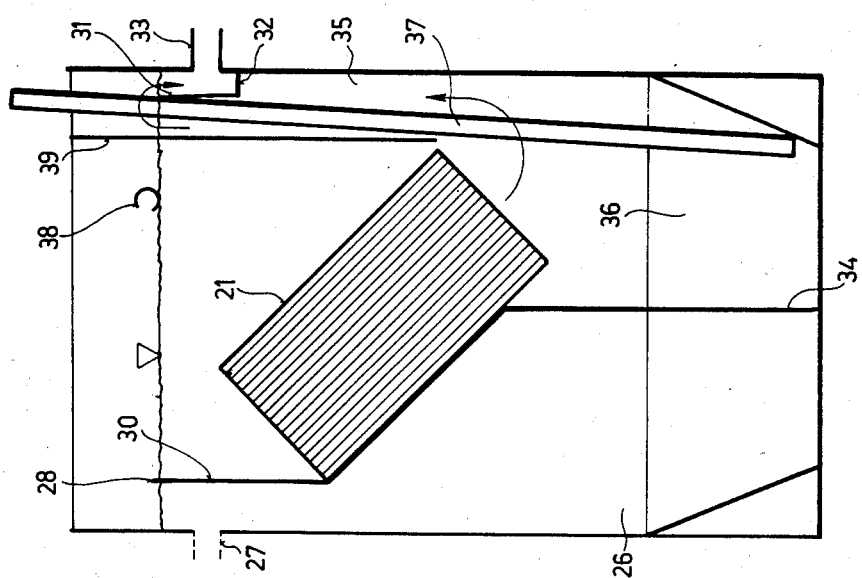
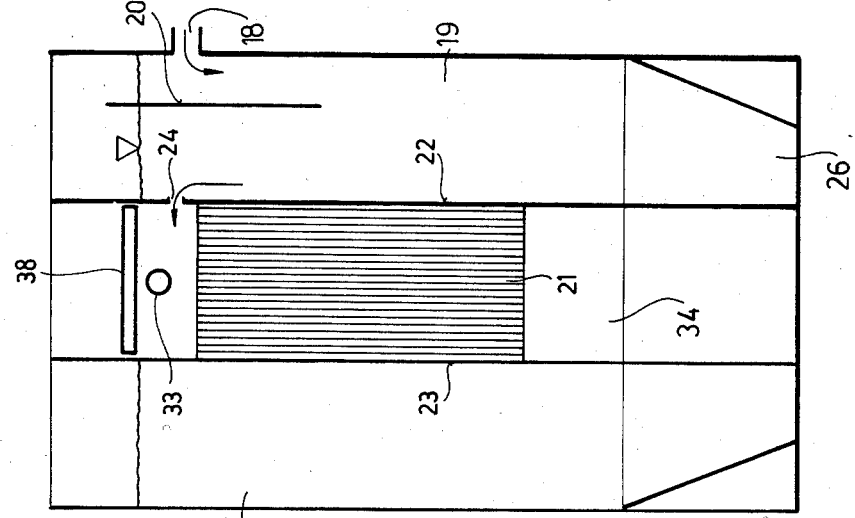
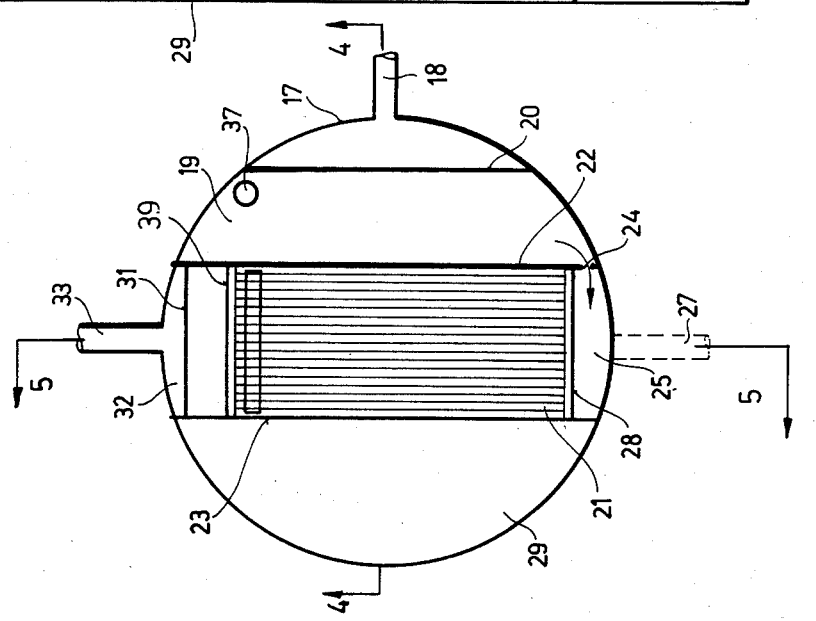

APPARATUS FOR THE SEPARATION OF SOLID AND/OR LIQUID PARTICLES FROM A LIQUID

This is a continuation of Ser. No. 124,444, filed on Feb. 25, 1980, now abandoned.

BACKGROUND OF THE INVENTION

The present invention concerns an apparatus or plant for the treatment of liquids, particularly for the separation of solid and/or liquid particles from a liquid, which particles can have a smaller or greater specific gravity than that of the liquid. Although the invention is not so restricted, it is particularly concerned with such separation taking place in a basin of cylindrical shape or polygonal cross-section and having a vertical axis of symmetry. The basin includes a pre-sedimentation space and a single-step or multi-step separation space, taken in the direction of flow of the liquid to be treated.

The invention furthermore concerns a lamellar (i.e. laminated multi-layer thin plate) construction serving for the above-mentioned liquid treatment purposes having channels, the axes of which are oriented in mutually parallel directions and which serve to separate solid and/or liquid particles from a liquid in liquid treatment plants or apparatus.

In the present invention, "liquid treatment" means in general purification of liquids e.g. purification or decontamination of effluents, in the course of which the liquid is separated from another liquid or from solid matter, or wherein the liquid is brought into contact with a gas or air, or wherein the liquid is subjected to a biological treatment. Also, "liquid treatment" is intended to include the cooling and degassing or de-aerating of liquids.

Modern water and effluent purification technologies have throughout the world required the establishment of modern liquid separation systems, such as sedimentation systems, to enable modern environmental protective plants to be provided.

Numerous plants and equipments are known for the fundamental task of separating particulate and/or suspended solid materials from liquids. One type of such plant consists of apparatus having a vertical axis and a circular or polygonal cross-section, made e.g. from prefabricated concrete rings in the manner of a well shaft.

In known circular well-like apparatus, used principally for small capacity petroleum oil or sand catchment basins, or for presedimentation or final sedimentation basins, there is essentially a single working space of cylindrical shape wherein the efficiency of the separation process, such as sedimentation, is relatively restricted. Such equipment does not permit separation processes, such as sedimentation to be optimized. This is because their efficiency is restricted and because of their large size their space requirements are large and hence they are uneconomical.

It is fundamental that separating equipment such as sedimentation devices should, as far as possible, eliminate turbulent flow conditions. From the point of view of sedimentation, use of laminar flow is a basic requirement to ensure that the suspended materials, particles and grains settle out undisturbed.

Laminar flow and turbulent flow can be distinguished by utilizing the Reynolds number. The Reynolds number should be less than 500, under optimal conditions, to ensure that sedimentation takes place during laminar flow.

Hitherto known separating basins of circular section have numerous other disadvantages. The liquid flow conditions in such devices are unfavourable as the flow is turbulent. Furthermore, one cannot obtain axially symmetrical radial flow in these known, small units and therefore the enhanced effects which might be available to be obtained from such flow conditions cannot be exploited. An example of such an enhanced effect is the possibility of radial flow between the so-called coalescent (drop-forming and coalescing) plates which in the case of separation of e.g. oily effluents provides considerable improvement in efficiency.

The invention seeks to ensure laminar flow conditions in complex separation processes taking place in currently known, circular-section, annular or polygonal section separation devices by the use of lamellar (laminar multi-plate) sedimentation systems. A further aim of the invention is to increase the efficiency of existing separation plants, e.g. in the case of oily effluents, to increase the efficiency of drop formation, and in general the invention seeks to eliminate, or at least to reduce, the disadvantages of known single-space circular-section or annular sedimentation basins, both from the point of view of efficiency and economy.

The invention also aims at achieving greater separation efficiency in known separation systems with a smaller plant in order to reduce the space or land area requirements while also reducing the investment and running costs.

The above-mentioned disadvantages become more evident in sedimentation basins of radial throughflow provided with mobile (circularly moving) sludge dredgers. This is because in such plants one cannot use fixed-position multi-plate lamellar elements because of the path of movement and construction of the mobile dredger.

There are additional disadvantages with radial through-flow sedimentation basins having mobile dredgers, namely that secondary flow patterns are set up and these have a disadvantageous influence on the hydraulic and technological efficiency.

Secondary flow can also be produced e.g. by the temperature differences in the effluent or raw waters, which temperature difference can be as low as 1°–2° C. and in such cases the secondary flow entrains the particles in the course of their settling out and conveys them to the upper layers of the basin, whereby the sedimentation process is slowed down and a significant proportion of the suspended matter exits in the discharged water. Another disadvantageous influence on flow conditions in known radial through-flow basins is due to winds which significantly modify flow conditions in the vicinity of the water surface. This factor is significant primarily in the larger diameter sedimentation plants such as the Dorr-type basins wherein the water surface can deviate from the horizontal by several millimeters under the effect of wind. As a consequence, the loading of the discharge weir is unfavourable because this loading varies from point to point along the perimeter of the unit and this is very unfavourable from the point of view of distribution of residence times.

Similarly, disadvantageous effects can be exerted by certain movable constructional elements of the dredgers as well as baffles and underwater walls which can produce undesired flow patterns and dead spaces.

Accordingly, a further aim of the invention is to ensure laminar flow conditions in hitherto known circular or polygonal section sedimentation basins provided with mobile dredgers while eliminating or reducing the above-mentioned disadvantages and improving efficiency, as well as other parameters of economy. The invention thus aims at reducing the size of the plant thereby decreasing the investment costs, running costs and the land area requirements.

DESCRIPTION OF THE INVENTION

The invention provides a means to accomplish the aforesaid objectives by converting a newly built or already existing circular section or polygonal-section, single-space separation basin into a multi-space basin by the use of partitioning walls which may be concentrically circular or which are planar and parallel with the generatrix or generatrices of the shape of the basin. Furthermore, a laminar or lamellar plate system is provided for sedimentation; in given cases, in the interests of increasing efficiency, coalescent steps of, e.g. radial through-flow, are also formed.

In the case of a newly built or already existing circular section sedimentation basin, e.g. of the Dorr type, wherein there is a circularly mobile dredger, the invention is carried out by suspending the lamellar plate sedimentation elements from floating bodies and/or mobile bridges or by connecting them to a dredger resting on the bottom of the basin. The sedimentation elements consist of obliquely disposed mutually connected arcuate elements between which the sedimentation and separation takes place under laminar flow conditions, while at the same time the laminar elements move with the dredger or, (in the case of a dredger movable along the bottom of the basin), the elements may be of fixed position.

In order to provide a means to accomplish the above aims and objectives, this invention provides a lamellar plate system which can be built into the different working spaces of the plants for ensuring optimal flow conditions.

The invention is based on the discovery that laminar flow conditions can be ensured even in circular section vertical cylinder-shaped, single-space separation plants by mounting oblique lamellar plate elements therein and dividing the single space into several spaces, whereby to achieve linear flow or radial flow symmetrical about the vertical axis. In addition to ensuring separation under laminar flow conditions at lower specific surface area and volume requirements, according to the invention, additional separation stages or steps can be provided in the working spaces of the plant e.g. pre-sedimentation and/or coalescent drop formation stages, as well as storage of the separated material.

In this way the invention provides several novel improved or enhanced separation effects which could not be provided in known circular-section sedimentation basins employing prefabricated concrete rings or rings made in situ from concrete.

The apparatus according to the invention serves for the treatment of liquids, primarily for the separation of solid and or liquid particles from the liquid to be treated. The particles to be separated can have a specific gravity lower, higher or both lower and higher than that of the liquid, preferably the particles are separated into a basin of cylindrical shape with a vertical axis or in a polygonal section basin. Taken in the direction of the flow of the liquid to be treated, the apparatus consists of two working spaces, namely a presedimentation space followed by a single-step or multi-step separation space. In the separation space, or in a part thereof, there is at least one lamellar construction containing channels the axes of which are mutually parallel.

If the basin is of the radial through-flow type, i.e. axially symmetrical, then in the direction of flow, thereof from the inside outwardly, a central well is provided around which is a first space containing an obliquely disposed, essentially radial lamellar insert system through which the direction of flow is from the inside outwardly, followed by an annular space surrounding the first space which serves to effect drop formation and separation. This annular space contains a horizontal or nearly horizontal coalescent lamellar system with an internal annular entry surface and an outer annular exit surface.

Preferably, the horizontal or nearly horizontal coalescent lamellar plate system is formed from half-circular arcs and/or full circular arcs which are superposed on each other and are connected together symmetrically both vertically and horizontally, the direction of the flow is perpendicular to the arcs.

In another embodiment, the circular section basin, in which the liquid flow is linear, is divided by means of planar partition walls which are essentially parallel with the generatrices of the outer surface(s) of the basin into a pre-sedimentation space, a sedimentation or separation space and a storage space, taken successively in the direction of flow. These spaces are interconnected by pipes or ducts. An oblique lamellar insert is disposed in the separation space.

If in a radial through-flow sedimentation basin there is provided a mobile dredger, then the lamellar sedimentation elements and devices are suspended from and/or connected to one or more floating bodies referred to as floats and/or are suspended from or connected to one or more mobile radial bridge member(s) and can thus move with the dredger. In this case, the lamellar elements are so disposed that the channels between the plates are generally radial, rising outwardly from the center point. In an advantageous embodiment, the oblique lamellar construction extends over the whole surface of the basin. In another possible embodiment the oblique lamellar construction is disposed only at the outermost peripheral annulus of the basin, or only along a sector of the basin; optionally, even in the last-mentioned case, only at the outermost annular portion of the sector. In such an embodiment the angle subtended by the sector at the center is expediently between 30° and 270°.

In a very advantageous preferred embodiment, the lamellar elements are suspended from respective floats at their radially outer and inner ends, the floats being interconnected by means of radial holder members disposed above the surface of the water.

In another advantageous embodiment, the suspension floats are peripherally ribbed prefabricated hollow shell or solid constructions. The peripheral ribs of the floats include two radial ribs and two ribs perpendicular thereto.

Expediently, there are openings in the ribs of the floats which are perpendicular to the radial direction.

The extent to which the floats submerge in the water is such that the openings formed radially of the circular basin should remain free to at least 80% thereof or should remain above the water surface.

Lifting hooks on the upper ribs of the floats may expediently be used for enabling the floats to be transported.

The lower part of the radial ribs of the floats are formed as oblique trihedral bodies while the extended suspension rods are formed as supporting legs.

Preferably a mobile suspended wall extends down to the bottom of the basin from the last floats before the discharge weir disposed at the periphery of the circular basin. The floats are connected with each other by means of fixing elements. The material of the floats is preferably a corrosion-resistant plastic material having internal cavities e.g. glass-fiber reinforced polyester P.V.C., polyethylene or the like; or hollow steel, aluminium or the like provided with suitable anti-corrosion protective coating, but it may also be a solid or hollow wooden structure.

Most favourably, the floats are formed as a closed shell structure, or as a multi-layer sandwich structure with a filler material of specific gravity lower than that of water, e.g. with a synthetic foam, but they may also be provided with, e.g. a pneumatic plastics or rubber structure which is filled with pressurized air or gas.

With the aid of the invention, the many thousands of existing sedimentation basins of this type may be improved in efficiency and increased in capacity, thus leading to considerable savings of costs.

It is of very great advantage that the circularly moving dredgers widely manufactured throughout the world may still be used while simultaneously achieving laminar sedimentation of high efficiency.

The method of constructing of the lamellar structure employed is very important. It has been found that especially favourable sedimentation and separation characteristics can be achieved where the lamellar structure employed contains many sharp, acute-angled corners. This is because along these acutely angled corners the materials to be separated deposit or settle out preferentially.

In the lamellar structures according to the invention which contain channels of mutually parallel axes, the walls of the channels may be formed by partitioning elements of arcuate cross-section, expediently all of the same radius of curvature, in such a way that the edges of the individual arcuate sections are located at the center of the interior of the adjacent arcuate section, or are connected thereto, and furthermore the center points of the arcuate sections coincide with every second point of intersection of a notional square or rectangular matrix representing the configuration of the elements.

Preferably, the spacing or distribution of the square or rectangular matrix is greater than the radius of curvature of the arcuate sections.

It is also expedient to select the partitioning elements to be of semicircular cross-section.

A further advantage is afforded by the preferred embodiment wherein the circular-section partitioning elements are formed or constituted by pipes, the outer surfaces of which are slit in the direction of the generatrix along one-half of the length of the channel and the individual pipes are laced together by inter-engagement of their slits, in mutually opposite directions.

In another preferred embodiment, the semicircular cross-section partitioning elements are formed as a unitary component rigidly fixed to each other along their edge generatrices.

In a further possible preferred embodiment, the semicircular cross-section partitioning elements are rigidly secured together to form a single continuous component by being connected together along their edge generatrices by planar plates.

In the interests of increasing the specific surface area, in one preferred embodiment, planar partitioning elements are disposed between the circular cross-section partitioning elements, advantageously along the lines of the square or rectangular matrix.

A further surface-increasing effect can be achieved in the embodiment wherein the circular and/or planar partitioning elements are provided with arched or convex portions. Finally, it may be advantageous to use a preferred embodiment wherein the edge of the lamellar construction made up from circular cross-section partitioning elements is bounded by fully circular cross-section closing partitioning elements the outer surfaces of which are slit along a single generatrix.

In the preferred embodiment of the apparatus according to the invention, wherein a coalescent lamellar system is also present, the use of radial and laminar flows ensure, e.g. in the case of oily effluents, the formation of droplets from oil particles of dimensions of the order of microns, whereby they may become separated. That is to say, the removal of oily contaminants and the efficiency of the purification are improved, these being ever greater requirements on a worldwide scale.

With the apparatus and/or lamellar system according to the invention, the favourable separation can be ensured with a lower specific volume and throughflow times, which factors give rise to further significant savings of cost.

It is a great advantage that with the aid of the invention already existing sedimentation plants and equipment, oil catchers, grease-catchers and other circular wells can be converted in a short time, to achieve an increase in capacity and efficiency as well as a saving in cost and surface area requirements.

It is a further advantage in the case of a new plant that the apparatus can be constructed from prefabricated elements such as concrete rings, reinforced concrete segments, shaped bodies and the like which give rise to transportation and in situ erection, savings in cost.

The apparatus according to the invention may be realised by prefabrication in a factory from a variety of constructional materials, or by in situ construction technologies, e.g. from steel, aluminium, plastics materials etc. In the latter case, a box or container-like structure is advantageous because this enables modern prefabrication methods and short in situ erection becomes possible.

BRIEF DESCRIPTION OF DRAWINGS

The invention is described below with the aid of preferred embodiments illustrated by way of example in the drawings, in which:

FIG. 3 is a schematic plan view of a second preferred embodiment of apparatus according to the invention, FIG. 4 is a cross-section, taken along the plane parallel with an oblique lamellar plate separator, of the apparatus of FIG. 3, FIG. 5 is also a schematic cross-section of the apparatus according to FIG. 3 but taken along the plane of the effluent or raw water infeed.

DESCRIPTION OF PREFERRED EMBODIMENTS

Figure 1:
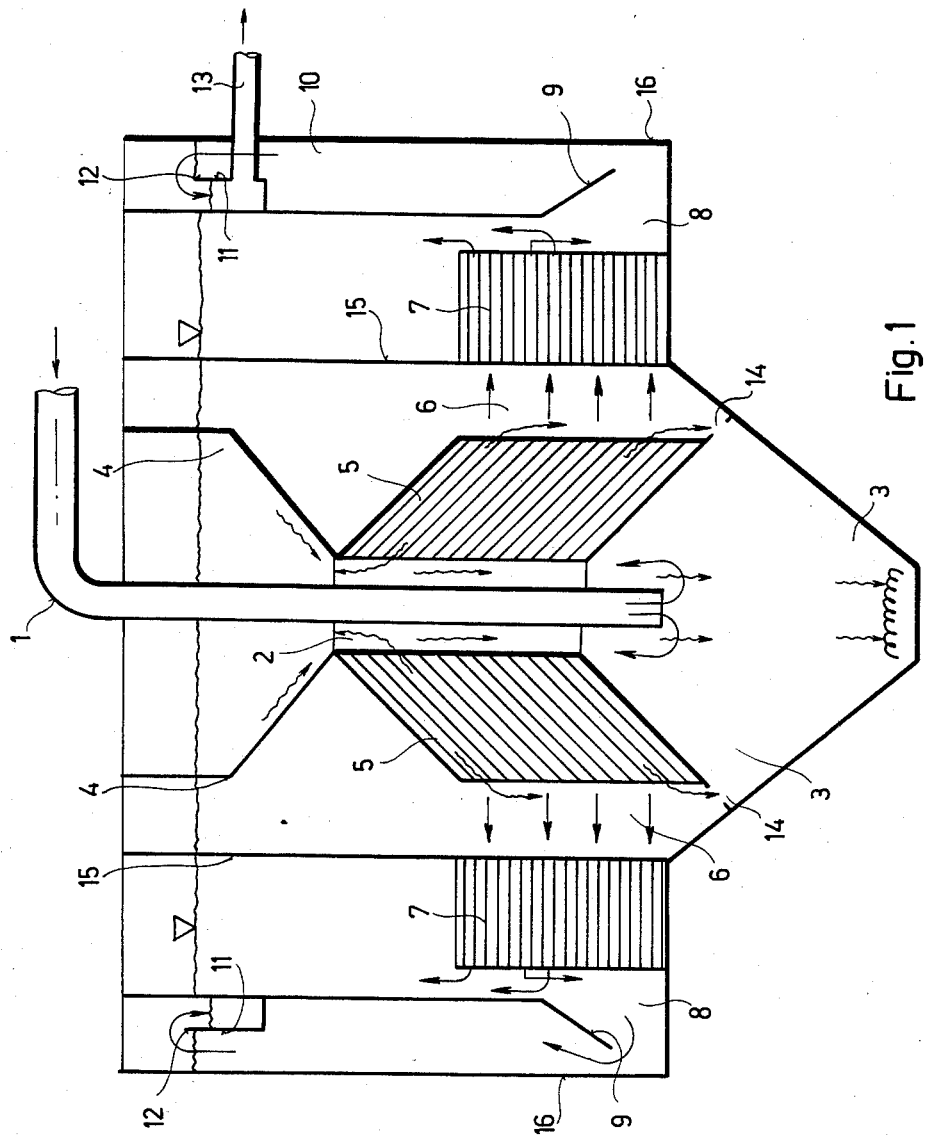
FIG. 1 is a schematic cross-section of a first preferred embodiment of apparatus according to the invention.
Figure 2:
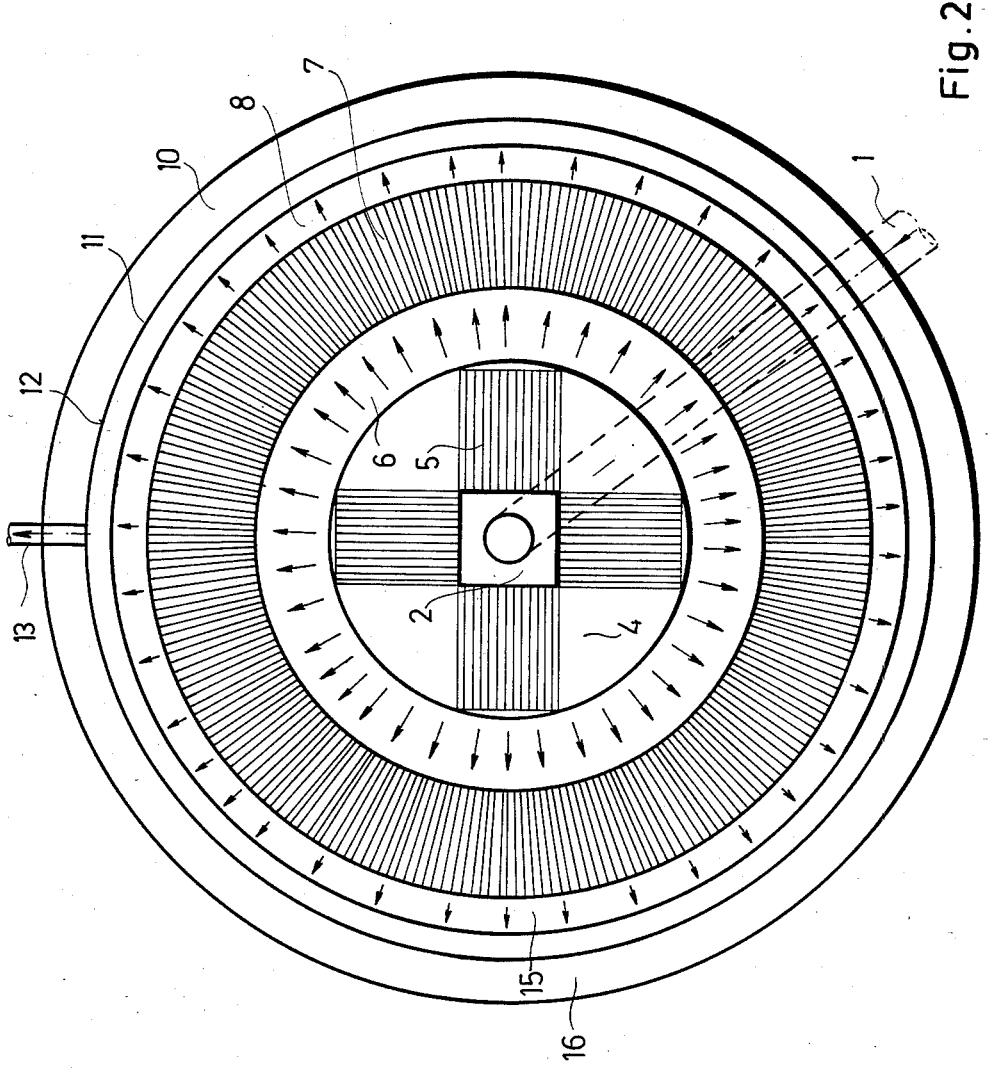
FIG. 2 is a schematic plan view of the apparatus shown in FIG. 1.
Figure 6:
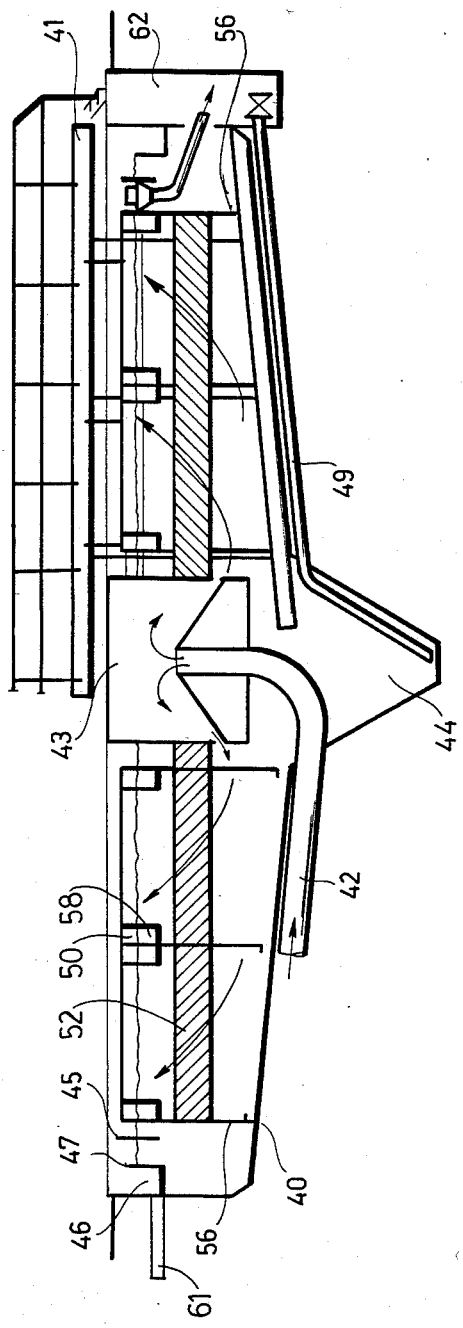
FIG. 6 is a cross-section of a preferred embodiment of apparatus according to the invention wherein a mobile dredger is also provided in the basin.

Referring to the FIGS. 1 and 2 of the drawings there is shown an apparatus consisting of two concentrically disposed basins. The apparatus is constructed from prefabricated concrete rings but it may also be constructed in a different manner.

There is provided an internal circular basin 15 in which is disposed an inclined lamellar insert system 5 which may have two, three, four, five, or six more members. In the insert system 5 separation of e.g. oils, fats or greases, suspended material etc. takes place under laminar flow conditions.

A collection space 4 for the separated materials is formed above the lamellar insert system 5 and the lower end of the collection space 4 debouches into a vertical well portion 2. The well portion 2 is, in the interest of forcing the effluent to circulate, disposed between the collection space 4 and a pre-sedimentation sludge chamber 3. The upper surface of the sludge chamber 3 borders on the lamellar insert system 5 while its lower portion is formed by oblique surfaces for the purposes of collecting the sludge and concentrating it. Proceeding radially from the lamellar insert system 5 there is an intermediate space or chamber 6 which guides the sludge separated in or after the insert system to a sludge collection chamber 14 which has inclined side surfaces and is disposed in the lower end portion of the space 6.

An outer circular-section basin 16 is disposed concentrically around the internal circular basin 15 in which basin 16 annular spaces 8 and 10 are formed. The spaces 8 and 10 are separated from each other by a baffle 9. A lamellar coalescent plate system 7 is disposed in the annular space 8 and consists of annular or circular section or polygonal segments. The liquid to be separated flows radially through the plate system 7 with a laminar flow characteristic. The plates are of coalescent characteristics to provide increased separation. An annular overflow trough 11 is disposed at the height of the upper water level in the outer annular space 10 and the purified separated liquid passes into it over a weir 12 whereafter it can be moved from the system by a duct 13.

The apparatus shown in FIGS. 1 and 2 operates as follows:

The liquid to be separated, e.g. an oily effluent, enters the apparatus through the raw water inlet pipe 1 and is fed either by gravitation or under pressure. From here it passes down into the pre-sedimentation sludge space 3 wherein sand and other sedimentable materials settle out. After pre-sedimentation the liquid to be purified flows upwardly and materials of lower specific gravity than that of the liquid e.g. oil, grease etc., float up to the collecting space 4. The liquid to be purified flows radially through the inclined lamellar insert system 5 where under laminar flow conditions enhanced separation takes place. The material particles, such as oil, separated out in the lamellar insert system 5 flow back along the upper inclined edge of the plates into the well portion 2 wherein they float upwardly into the collection space 4.

The material that settles out between the plates 5 slides downwardly and passes into the intermediate space 6 in the lower portion of which is the sludge collecting and concentration chamber 14. The sludge may periodically be pumped out or discharged by gravitation or pressure from this space for further storage.

The pre-cleaned separated liquid is then guided to flow in the direction of the outer perimeter, more particularly through the horizontal coalescent laminar system 7 wherein enhanced laminar flow takes place and, in the case of oily contaminations, under the effect of the coalescent plates the relatively smaller oil particles, e.g. of a size of the order of magnitude of 1 micron, are formed into drops and are separated or rather are buoyed up to the upper surface of the space wherein they may be decanted or skimmed off and thus the separated oil can be removed.

As can be seen from FIG. 1, the decontaminated and separated liquid passes under the guidance of the baffle wall 9 to the annular space 10, wherein it rises and at the height of the level of liquid passes over the weir 12 into the overflow trough 11 and from there via the duct 13 the clean liquid is discharged from the apparatus.

As can be seen from FIG. 2, the circular basins 15 and the annular basin 16 are concentric about a common central axis; the lower sludge space or chamber 3 is under the central well portion 2. The lamellar insert 5 is radially coupled around the well portion 2 and the elements of the system 5 are closed at their sides. In this way a liquid can only pass on by flowing through the lamellar insert system 5. After the intermediate space 6 the coalescent lamellar plate system 7 is radially next in the direction of liquid flow and the liquid enters in a uniform flow into the lamellar plate system 7 through a perforated surface suitably of a gridlike structure formed on the partitioning wall of the inner circular basin 15.

The further annular spaces 8 and 10, overflow trough 11 and weir 12 are fully circular-section components. The discharge duct 13 can be connected to the overflow trough 11 at any circumferential point thereof.

Referring to the second preferred embodiment shown in FIGS. 3 to 5, FIG. 3 shows a circular cross-section vertical cylindrical basin 17 divided into several spaces giving rise to a very compact and economic configuration.

The effluent or raw water inlet 18 receives the water to be purified either under gravitation or under pressure and the effluent e.g. oily effluent, then passes into the pre-sedimentation space 19. Here the particulate materials, sand, or sludge are settled out.

The mass of effluent arriving from the duct 18 passes under a suspended wall 20 which wall has an energy absorbing role also. The already-mentioned pre-sedimentation space 19 is formed with a lower portion suitable for storing the settled-out sludge and sand and in the interests of concentrating the sludge this bottom portion is provided with inclined side walls.

The sedimenting inclined lamellar insert portion 21 is disposed in the region of the central longitudinal axis of the apparatus and is separated from the rest of the circular basin by side partition walls 22 and 23. From the presedimentation space 19 the water or effluent passes through an opening 24 into a sedimentation space 25 wherein repeated concentration takes place, to which end this space 25 is also provided with a lower sludge collecting space 26. Where the effluent to be purified does not contain materials which can be presedimented to any significant extent, then it may be led directly into the sedimentation space 25 and therefore an effluent inlet duct 27 is provided for feeding in effluent, if required even simultaneously with effluent infeed via the duct 18. In the case where the infeed takes place at two locations, the two effluents mix in the sedimentation space 25.

From the sedimentation space 25 the effluent passes over the weir 28 formed on the wall 30 and then flows downwardly through the inclined lamellar insert 21. Between the individual plates of the inclined insert 21 a so-called laminar flow is formed and this provides increased or enhanced separation for the liquid.

The cross-section of the lamellar insert 21 may be any of numerous known cross-sectional shapes and the general task of the insert is to separate during laminar flow those elements which can be separated by gravitation, e.g. oil, greasy contaminants and the like and these contaminants should then rise to the operational water level of the apparatus while any sludge or other sedimentable particles still present should sink down among the inclined plates to be collected in the lower sludge collection space 36.

The floating and concentrated contaminants that have risen to the surface of the water, e.g. a layer of oil, may be removed by any known skimming or doctoring mechanism e.g. by a separating pipe 38 and can be removed via a duct into a collection space 29 from which it may be periodically discharged for further processing or utilization or incineration. The water purified in the inclined lamellar insert 21 is passed on under a partition wall 39 in a uniform manner and across the full cross-section. This purified water then passes over a weir 31 into an overflow trough 32 and from there it is discharged from the apparatus via a duct 33.

The sludge collection space 34 disposed under the presedimentation space 19 is separated by a partition from the sludge collecting space 36 underneath the secondary sedimentation space 35. The separated sand or sludge can be removed either by gravitation or by pump from all three sediment-collecting or sand-catching spaces, namely 19, 26 and 36, and can be either further concentrated or mechanically de-watered or otherwise further utilised.

Referring particularly to FIG. 5, the inclined lamellar insert 21 may be constructed with varying degrees of inclination, adjusted in accordance with the particular task of separation, the angle of inclination being e.g. between 45° and 70°. For particularly sludgy effluents it is advantageous to use an angle of inclination between 55° and 60° which should ensure the self-cleaning capacity as well as the gravitational sliding down of the sludge into the lower sludge collection space 26 and 36.

The inclined lamellar insert portion may be manufactured in a container-like (modular) manner e.g. in a steel frame, which provides for easy and modern transportation and mounting in position.

Regarding the direction of the movement of the liquid, the inclined lamellar insert 21 may be oriented or positioned in two ways:

for separating materials of specific gravity lower than that of the liquid, e.g. oils, fats, suspended materials etc., it is necessary to pass the liquid through the inclined lamellar insert 21 from above downwardly;

for separating materials of a specific gravity greater than that of the liquid, it is necessary to pass the liquid through from below upwardly.

As has already been mentioned and as can be seen in FIG. 4, the raw effluent can be passed into the sedimentation space 25 directly from the duct 27 and then passed over the weir 28 directly into the inclined lamellar insert 21, to effect separation.

The partition wall 34 divides the sedimentation space into two spaces 26 and 36 (see FIG. 5) to ensure that the presedimented effluent passes in a direct and forced flow through the inclined lamellar insert 21. Just as the outer wall of the apparatus, the material of the partition wall may vary and may be made, e.g. from prefabricated concrete, steel, aluminium or a synthetic material, e.g. glass reinforced polyester.

Ramps inclined e.g. at an angle of 60°, are provided at the sides of the sludge collecting spaces 26 and 36 and they may be prepared from concrete made in situ or from other constructional materials. The constructional material of the weir 31 may be an adjustable steel construction, while the overflow trough 32 may be either concrete or some other suitable constructional material (see FIGS. 3 and 5).

As can be seen from FIG. 3, the raw water e.g. effluent arriving via the duct 18 flows directly downwardly under the effect of the suspended wall 20 to ensure the flow conditions for presedimentation. The sludge and sand collection space 26 under the presedimentation space 19 is also expediently formed with inclined side walls (see FIG. 4).

The periodic removal of sand and sludge takes place via duct 37 either by means of a mobile sludge pump or by gravitation. Another possibility for collecting the sand and the sludge is to place, e.g. a steel container in this space which stores and collects the sludge under the water and then periodically lift out the container, transport it away and replace it with an empty container.

Referring now to a preferred embodiment of the apparatus according to the invention illustrated in FIGS. 6 to 9, there is shown a known circular-section sedimentation basin 40 provided with a circularly moving sludge dredger 41 which can have one, two or several arms. The dredger and its configuration are known.

The bottom of the sedimentation basin 40 has ramps and is in general made from concrete while in its central axis at the lower central line of the basin there is provided with a trough 44. A water distribution system 43 coupled to an effluent duct 42 is also disposed at the central axis of the basin.

Along the periphery of the basin 40 is an annular overflow trough 46 and the guide rails of the circularly movable dredger 41 driven by a motor 48 at a desired speed around the basin about the central axis.

From the effluent inlet duct 42 the liquid to be settled passes into the central distribution system 43 whereafter in uniform circular distribution it passes radially across the full cross-section during which a sedimentation process arises, in which the sludge accumulates at the bottom of the basin and the circularly moving dredger 41 displaces the accumulating sludge into the central trough 44. From there, the sludge passes via the sludge duct 49 out of the system for concentration or other processing e.g. decomposition or mechanised de-watering or incineration.

After sedimentation in the sedimentation basin 40 the water passes over the weir 47 and the trough 46 into the duct 61 for settled water and from there it can be removed for further processing or use. A suspended wall 45 placed before the weir 47 prevents the discharge of the so-called floating sludge so that the settled and partially cleaned water is retained together with the floating sludge.

In the apparatus according to this preferred embodiment at the surface of the sedimenting basin 40 there is at least one floating body 50 serving as a carrier for a lamellar sedimentation system 52 suspended under the water at a depth of about 20 to 80 cm in an inclined position with the aid of suspension elements 51. The lamellar sedimentation elements are distributed over the whole surface of the basin 40 in such a way that the direction of rising of the inclined elements 52 should be radially outwardly, i.e. towards the periphery of the circular basin 40.

The floating bodies 50 are connected to each other and to the circular dredger 41 by shaped connecting bodies 53 and thus the bodies 50 move with the dredger 41 along the circular path in the sedimentation basin 40. On the floating supporting element at the periphery of the basin 40 a curtain wall 56 is arranged to guide and force the liquid to be settled to flow through the inclined lamellar elements 52.

The raw water to be settled arrives via the effluent duct 42 and passes from the central distributor 43 in a first step in a horizontal and radial direction, then rises to a higher level and enters the inclined lamellar insert 52. It then passes into a region of laminar flow and sedimentation. In the thus formed microcells or microspaces an intensive separation and sedimentation process takes place during which materials with a specific gravity higher than that of the liquid pass along the lower edges and plates of the inclined insert 52 into a lower space to the bottom of the basin. Materials with a specific gravity higher than that of the liquid rise up to the surface of the water and form a so-called floating mud or sludge.

The floating sludge collected along the surface of the basin floats towards the periphery of the sedimentation basin where a known extension member connected to the circularly moving dredger 41 removes it from the surface of the water and passes it into the floating sludge collector 62.

The floating bodies 50 are provided with suitable radial openings 55 to ensure the circulation of the water at the surface thereof and to ensure the passage of the floating sludge. The suspension elements 51 for the floating bodies 50 are provided with supporting leg portions 54 so that in the event of a fault, shut-down or, periodical cleaning the basin can be more easily emptied. In which case the floating bodies 50 and the sedimenting elements 52 "sit" via the supporting legs 54 on the bottom of the basin. The length of the supporting legs 54 may vary in accordance with the depth of the basin.

Figure 7:
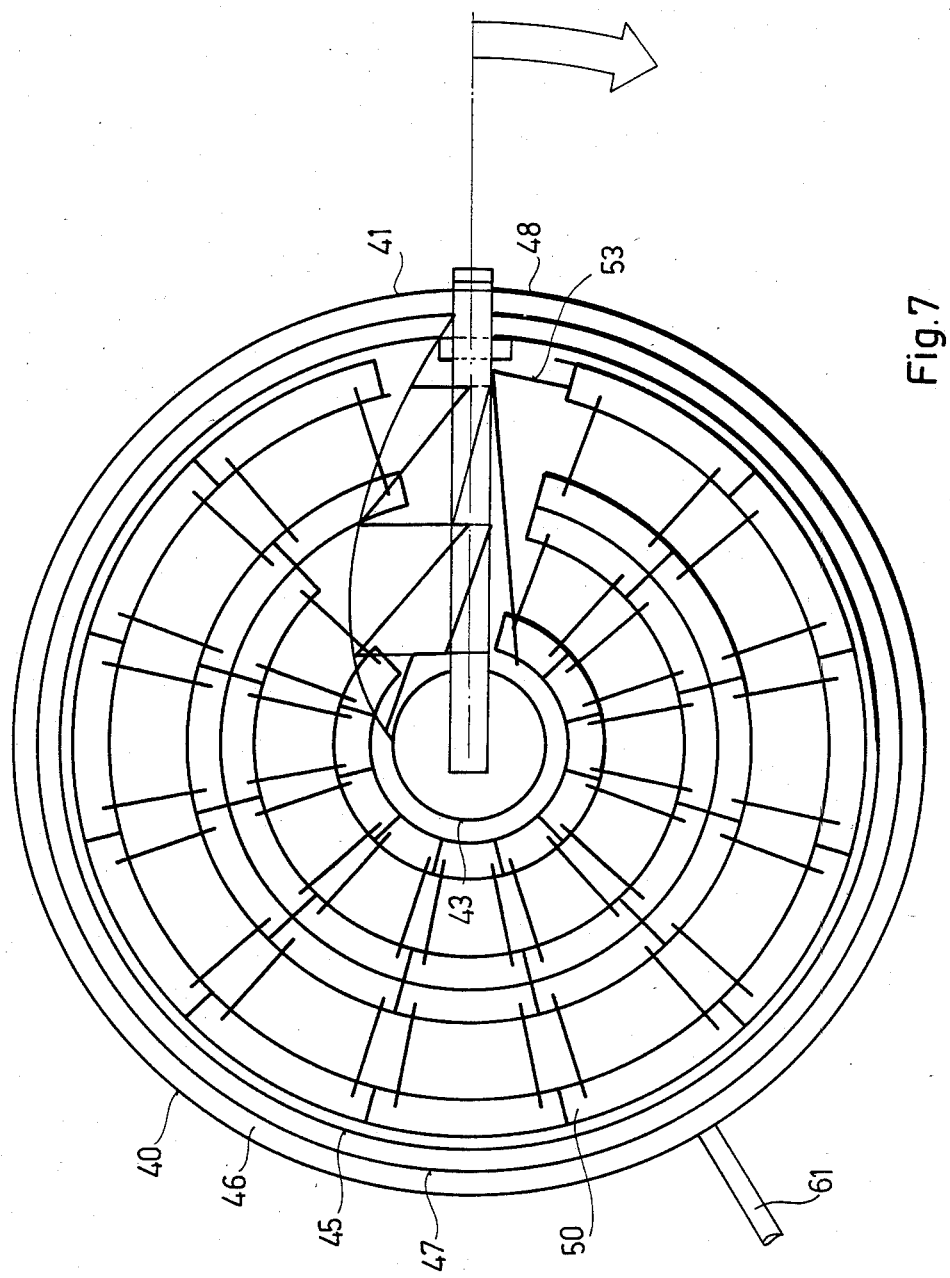
FIG. 7 is a schematic plan view of the apparatus according to FIG. 6.
Figure 9:
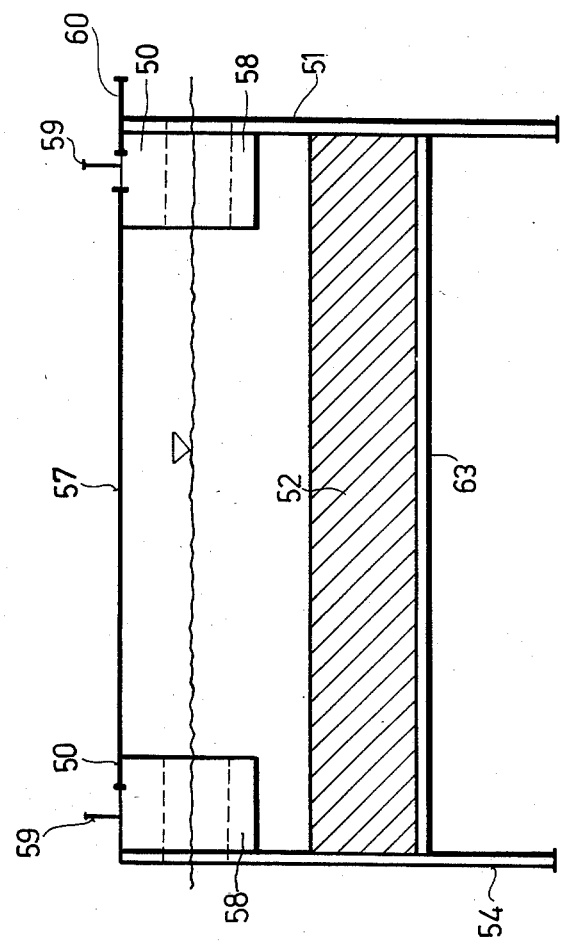
FIG. 9 is a side view of the insert shown in FIG. 8.
Figure 8:
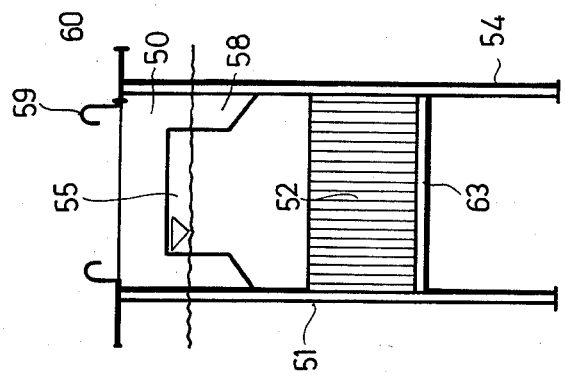
FIG. 8 is a front elevation of a preferred embodiment of a lamellar insert utilised in the apparatus shown in FIGS. 6 and 7.

As may be seen in FIG. 7, in the sedimentation basin 40 provided with the circular and circularly moving dredger 41, the floating bodies 50 are disposed in a radial direction and are ribbed and framed to suspend the inclined lamellar sedimentation elements or system 52. The floating bodies 50 are connected to each other as well as to the circularly moving dredger 41 so as to move with it and in the same direction as the dredger 41. The lamellar sedimentation elements 52 are held together by a plate holder 63. When the circularly moving dredger 41 moves around only at the bottom of the basin and does not have an upper circularly moving dredging element, then the floating body suspension system may be fixed in position and a generally radial fixed bridge construction may be employed for assembling, monitoring and service purposes.

Modern prefabrication requirements may be maximally ensured with the apparatus according to the invention since the floating bodies 50 and the lamellar elements 52 can be fabricated in a factory and may be made from various different economical and corrosion-resistant materials or devices, whether hollow or solid or sandwich or gas-filled systems. Thus, for instance, they can be made from different synthetic materials, primarily glass-reinforced polyester, P.V.C., polyethylene etc. or from other hollow closed shell elements made from steel or aluminium, or from hollow or cellular or sandwich-like wood-based construction, or from pneumatic air- or gas-filled rubber or other floating elements.

At the outer periphery of the basins 40 is located a drive motor 48 for driving the dredger 41 along its circular path. In plants according to the invention, a surplus of energy is required for operating the plant in order to enable the floating bodies 50 coupled together on the surface of the sedimentation plant to move along their circular path about the central axis and therefore it is necessary that the drive motor 48 should have sufficient output. Therefore an existing motor may have to be exchanged for one of a higher output or a supplementary drive motor may have to be installed.

The peripheral floating bodies 50 provided with hollow or solid ribs have continuous radially extending ribs, while the rib provided perpendicularly thereto is an upper rib 57 with a holding and connecting function, and therefore underneath it the flow of water and of floating sludge is unimpeded and may take place continuously towards the outer edge. The degree to which the ribbed floating bodies 50 submerge in the water is such as to ensure that a radial flow of water at the surface should be unimpeded.

The radial ribs of the floating bodies 50 are trihedral bodies 58 in the form of a wedge pointing downwardly to ensure that the sludge floating towards the surface is not impeded and can be floated up in a continuous manner. Lifting hooks 59 are provided on the floating bodies to facilitate their installation, lifting out and transportation. The floating bodies 50 may be provided on their ribs and peripheral connecting surfaces with some resilient material, e.g. polyethylene foam or rubber to facilitate their alignment and matching together. The individual floating elements 50 are provided with releasable connection elements 60 to enable them to be fixed together in releasable manner. The releasable connection elements 60 are disposed either radially or at right angles to the floating elements 50 or are parallel with the outer periphery. These connecting elements 60 may be threadedly connectable fixing elements to enable the unitary and continuous floating element system 50 to be formed. When desired, the releasable connection 60 is released to enable the floating element system 50 to be dismantled to its constituent elements.

The floating element systems 50 may be formed to suit given basin dimensions or magnitude of radius, the elements being exchangeable and being utilizable for different basin dimensions, thus, sets of elements may be fabricated for given values of radius.

The sedimenting elements shown as the lamellar insert system 5 and/or the lamellar insert system 7 in the embodiment of FIGS. 1 and 2, or the lamellar insert elements 21 in the preferred embodiment according to FIGS. 3 to 5, and the lamellar elements 52 in the preferred embodiment shown in FIGS. 6 to 9 function most efficiently and economically if they are formed according to FIGS. 10 to 15.

Figure 10:
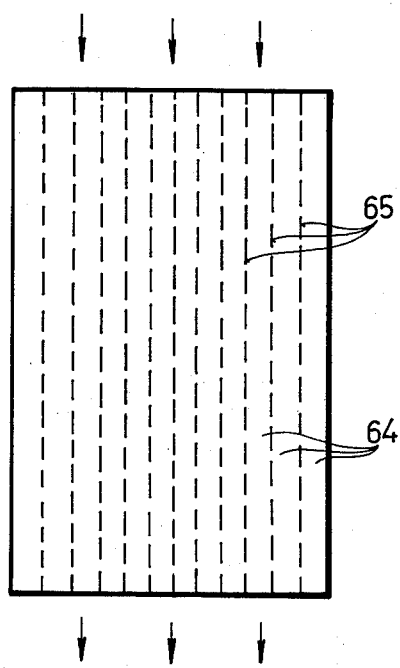
FIG. 10 is a schematic elevation of the lamellar construction according to the invention in a vertical orientation.

FIG. 10 shows a lamellar construction which has vertically disposed channels 64 formed by circular partitioning elements 65.

Figure 11:
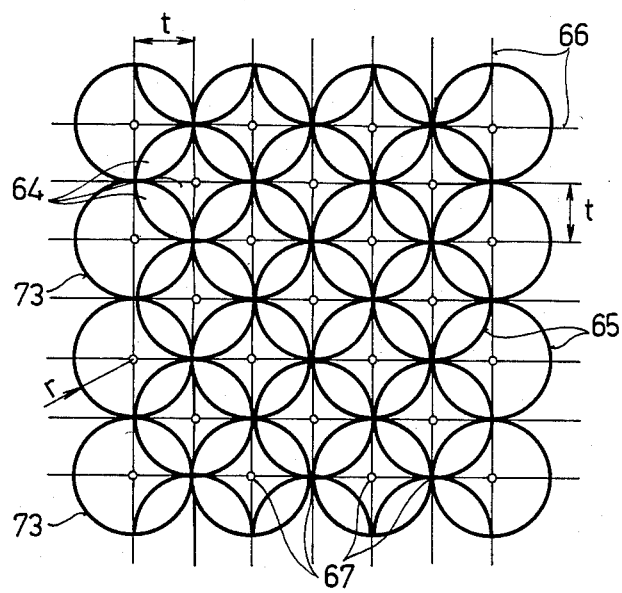
FIG. 11 is a cross-section of a favourable embodiment of the lamellar construction according to FIG. 10.

In the preferred embodiment shown in FIG. 11, the cross-sectional shape illustrated gives rise to particularly advantageous characteristics of sedimentation and separation because the cross-section contains many acute angled corners or cusps along which the materials to be separated deposit particularly well. The edges of the individual circles are disposed at or connected to the centers of the adjacent circles.

Expediently, the radii r of the partition element 65 are equal. From a point of view of manufacture and assembly and furthermore in the interests of achieving the greatest possible specific surface area, the center point of the individual circles fall at or coincide with every second intersection plant 67 of the square or rectangle matrix 66. The distribution or pitch of the square or rectangular matrix 66 is designated by t which is expediently greater than the radius r but in the case of a square matrix, t is smaller than $r\sqrt{2}$. This is because where the spacing or distribution of t is smaller than the radius r then an intricate cross section arises which is difficult to manufacture while if it is greater than $r\sqrt{2}$, in the case of a square matrix, the circular sections no longer intersect and the above-mentioned sharp angles do not arise.

Figure 12:
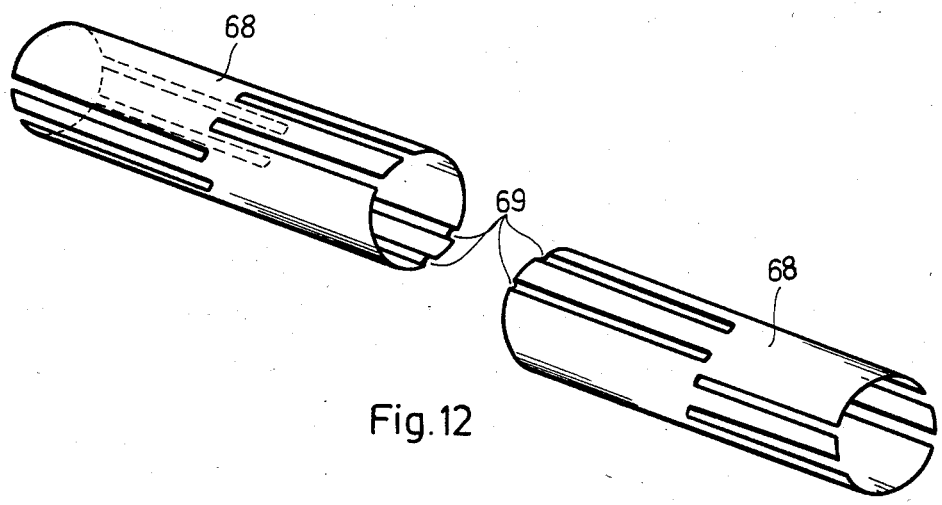
FIG. 12 illustrates two types which when interlaced form the lamellar construction.

In a further preferred embodiment shown in FIG. 12, the lamellar construction is made up of tubes 68. On the outer surface of the tubes 68, there are slits 69 extending in the direction of the generatrix up to the half way of the length of the tube 68. The tube 68 can be connected together with the slits 69 facing each other.

Figure 13:
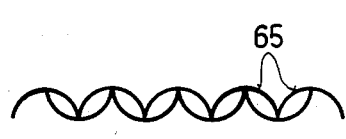
FIGS. 13 and 14 show further preferred embodiments of the partitioning elements of the lamellar construction and FIG. 15 is a cross-section of a preferred embodiment of partitioning elements provided with arched or convex portions.

A suitable lamellar construction may also be constructed from the circular cross-section partitioning element 65 illustrated in FIG. 13. Here the circular section elements are semi-circles and the individual partitioning elements are unitary components fixed together along their peripheral generatrices. The thus obtained elements shaped like a wavy line can be fixed together by being turned towards each other in such a way that the edges of the circular arcs of one element should be connected with the centers of the circular arcs of the other element. The material of these elements is expediently a vacuum-formed synthetic material or other material which exhibits good resistance to the material or liquid to be treated. The elements may be connected together, e.g. by adhesive bonding or welding. The preferred embodiment illustrated in FIG. 14 differs from the previous embodiment in that the edges of the individual half-circle sections are connected together by means of planar plates 70.

In this way, the semi-circular arcs and the planar plates 70 can be manufactured as a unitary component.

Figure 14:
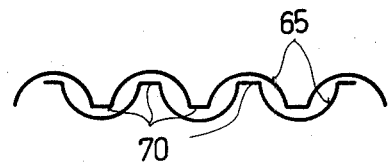
Figure 15:
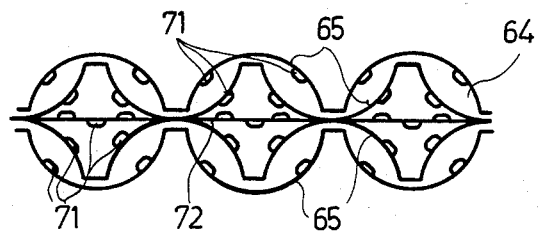

FIG. 15 illustrates a lamellar construction made up from the elements shown in FIG. 14 wherein planar partitioning elements 72 are interposed between the partitioning elements 65, expediently along the lines of the square or rectangular matrix 66. Convex or arched portions 71 formed on the circular section partitioning element 65 and/or on the planar partitioning element 72 serve to increase further the specific surface area.

Reverting to FIG. 11, at the edges of the lamellar construction, there are fully circular closing elements 73 the outer surface of which is slit along a single generatrix.

In addition to the above-illustrated Examples, the lamellar construction according to the invention shown in FIGS. 10 to 15 possesses advantages in other applications also. Thus when placed at an inclination, it can be well utilized for gravitational sedimentation tasks for sedimenting mud or sludge containing waters in old or existing artifacts. But another important area of application is clarification of effluent by flocculation, more particularly for the settling out of the flake in flocculated drinking water or effluent, and further in third degree purification tasks.

A further significant area of application is the use of the invention in flotation systems where after flotation the laminar construction according to the invention may be used for separation. Here one may mention the separation and removal of fats, oils or fibrous materials, e.g. contaminations in the paper industry, furthermore the separation of the suspended materials with a specific gravity greater than that of water, e.g. in the purification of industrial effluents in metal and coal processing, as well as the concentration of sludges in effluent purification systems employing live sludge.

What is claimed is:

1. Lamellar structure with closed cells for the separation of foreign matter from liquids, or for the contacting of the liquid with a gaseous substance, or for the biological treatment or cooling of the liquid, comprising mutually parallel channels, the walls of the channels being circular so that the edges of the individual circles are disposed at the centers of the inside of the adjacent circular element forming closed cells therebetween, and the center point of the arcs coincide with every second intersection point of a notional square or rectangular matrix.

2. Apparatus according to claim 1, wherein the pitch or spacing of the said matrix is greater than the radius of the circle.

3. Apparatus according to claim 1, wherein the said partitioning elements are formed as a unitary component by being fixed together along their edge generatrices.

4. Apparatus according to claim 1, wherein the said partitioning elements are formed as a unitary component by being fixed together along their edge generatrices with the intermediation of planar plates.

5. Apparatus according to claim 1, wherein there are planar partitioning elements interposed between the circular cross-section partitioning elements along the lines of said matrix.

6. Apparatus according to claim 1, wherein at least some of said elements are provided with convex surface-increasing portions.

* * * * *